United States Patent [19]

Murase et al.

[11] 3,948,539
[45] Apr. 6, 1976

[54] ENERGY ABSORBING STEERING ASSEMBLY

[75] Inventors: Genyo Murase, Nagoya; Hisahal Mineda; Yozo Yamaguchi, both of Toyota, all of Japan

[73] Assignee: Toyota Jidosha Kogyo Kabushiki Kaisha, Toyota, Japan

[22] Filed: Apr. 17, 1974

[21] Appl. No.: 461,650

Related U.S. Application Data

[62] Division of Ser. No. 256,872, May 25, 1972, Pat. No. 3,822,608.

[30] Foreign Application Priority Data

| May 25, 1971 | Japan | 46-35819 |
| May 28, 1971 | Japan | 46-37156 |
| May 31, 1971 | Japan | 46-37678 |

[52] U.S. Cl. ............................................. 280/87 R
[51] Int. Cl. ............................................. B62d 1/18
[58] Field of Search .......... 280/87 R, 87 A; 74/493, 74/492; 188/1 C

[56] References Cited
UNITED STATES PATENTS

| 2,770,981 | 11/1956 | Fieber | 74/493 |
| 3,394,612 | 7/1968 | Bogosoff et al. | 74/492 |
| 3,470,761 | 10/1969 | Okamoto et al. | 74/492 |
| 3,492,888 | 2/1970 | Nishimura et al. | 74/492 |
| 3,521,724 | 7/1970 | Mayer | 74/493 X |
| 3,621,732 | 11/1971 | Kanuit | 74/492 |

*Primary Examiner*—Kenneth H. Betts
*Attorney, Agent, or Firm*—Stevens, Davis, Miller & Mosher

[57] ABSTRACT

An energy absorbing steering assembly for a motor vehicle having a steering column supporting assembly for supporting the steering column substantially at a right angle from the instrument panel of the vehicle and a steering wheel supporting assembly being able to forwardly deflect. The steering column supporting assembly is enabled to bukcle to absorb forward impact energy when an impact force is exerted onto the steering wheel and the steering wheel supporting assembly functions to absorb further the forward impact energy in addition to the buckling operation of the steering column supporting assembly.

6 Claims, 32 Drawing Figures

ENERGY ABSORBING STEERING ASSEMBLY

This is a division of application Ser. No. 256,872, filed May 25, 1972, now U.S. Pat. No. 3,822,608.

BACKGROUND OF THE INVENTION

The present invention relates generally to vehicle steering assemblies and more particularly, to the type of steering column construction that is enabled to absorb forward impact energy by controlled deflection of the steering column components and the steering wheel assembly in occurrence of a vehicle collision.

To protect a motor vehicle driver in occurrence of a collision, there have been introduced various types of safety apparatus for steering assemblies. In the prior art devices, however, the safety feature is rather limited to local deformation of the steering wheel or to an axial deflection of the steering column, which is never enough to expect desired safety effects for the arivers, particularly, for certain types of vehicles. This has particularly been true for the drivers of tracks of cab-over type and buses the steering shafts of which are rather vertically provided to have the steering wheels positioned angularly toward the driver's bodies. Thus, the sharp angle of the impact load given to the drivers has resulted in serious damages against the drivers.

It should well be considered to be very ideal for the mentioned certain types of vehicles, if the drivers are protected by total impact energy absorbing operation obtained through enough deflective displacements of the steering column as well as the steering wheel.

BRIEF SUMMARY OF THE INVENTION

It is, therefore, a prime object of the present invention to provide a safety apparatus most properly designed for a steering column assembly which includes a steering shaft connected vertically with the vehicle steering gear by way of a flexible coupling to be forwardly deflective and a column tube having the steering shaft journalled rotatably therein.

It is another object of the present invention to provide a safety apparatus, having the above mentioned characteristics, wherein a steering column supporting assembly supports the steering column assembly substantially at a right angle from an instrument panel of a vehicle and is enabled to buckle to absorb forward impact energy when an impact force is exerted onto the upper portion of the steering column.

It is another object of the present invention to provide a safety apparatus, having the above mentioned characteristics, wherein the steering column supporting assembly functions to guide the displacing direction of the steering column when an impact force is exerted onto the upper portion of the steering column.

It is a further object to provide a safety apparatus, having the above mentioned characteristics, wherein a steering wheel supporting assembly is enabled to deflect to absorb further the forward impact energy in addition to the functions of the steering column supporting assembly.

It is still another object of the present invention to provide a safety apparatus, having the above mentioned characteristics, in which the safety apparatus can be manufactured compactly with a low production cost and be installed in the vehicle with simple assembling, the apparatus yet being durable and ensuring accurate operation thereof.

BRIEF DESCRIPTION OF THE DRAWINGS

The above and other objects, features and advantages of the present invention will become more readily apparent from the following description of the preferred embodiments with reference to the accompanying drawings forming a part of the specification.

In the drawings:

FIG. 6 includes FIGS. 6-A and 6-B; FIG. 6-A illustrates a cross-sectional view taken along B-B line in FIG. 3 and FIG. 6-B shows a modification of FIG. 6-A.

DESCRIPTION OF THE PREFERRED EMBODIMENTS

Figure 1:
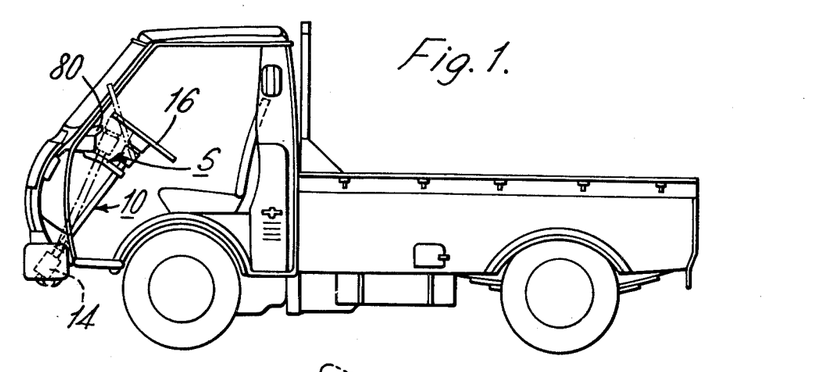
FIG. 1 is a side view of a cab-over type motor vehicle which adopts the present invention.
Figure 2:
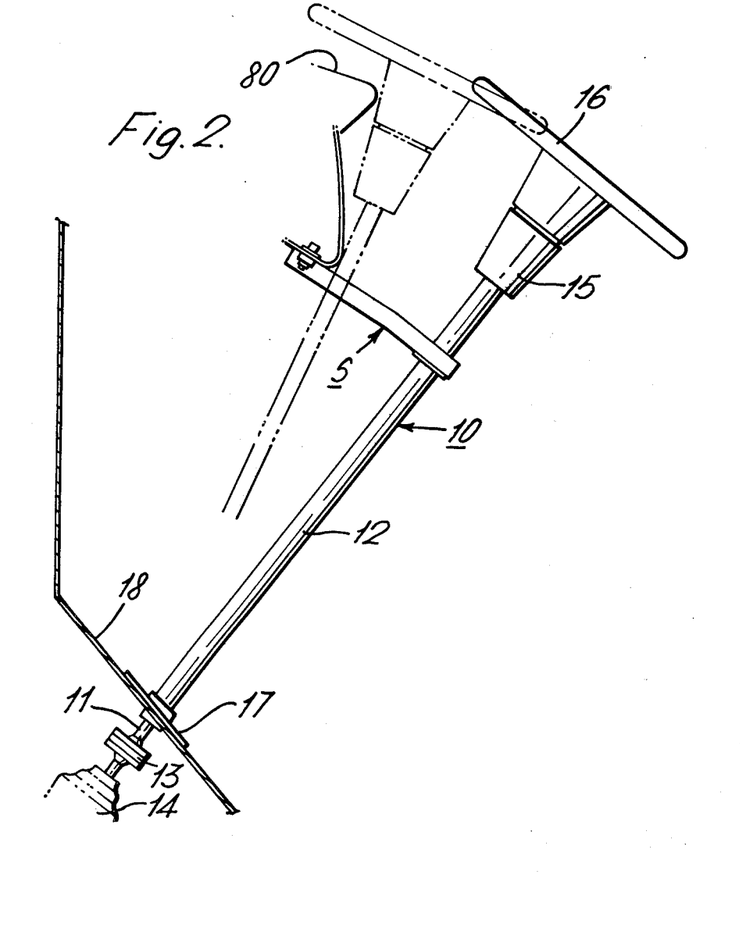
FIG. 2 is a side view of the steering column device of the motor vehicle in FIG. 1.

Reference is particularly made to FIGS. 1 and 2 wherein there is shown a steering column 10 including a column tube 12, a steering shaft 11 rotatably coupled within the column tube 12 and connected to the vehicle steering gear 14 through a flexible coupling 13, and a flexible cover 17 having the column 12 and steering shaft 11 engaged therein and covering up a fire wall 18. A steering wheel 16 is mounted on the upper end of the steering shaft 11 and a steering column cover 15 is installed at the upper end of the column tube 12. An energy absorbing device S features the most important portion of the present invention. The steering column 10 is supported on an instrument panel 80, which is a portion of the vehicle body, through the energy absorbing device S. In energy absorbing operation, the whole steering assembly is deflected to a forward position shown with dotted lines.

Disclosed hereinafter are several preferred embodiments of the present invention. To avoid unnecessary confusion, same and similar reference numerals are applied for the same and similar parts throughout all the embodiments.

Figure 3:
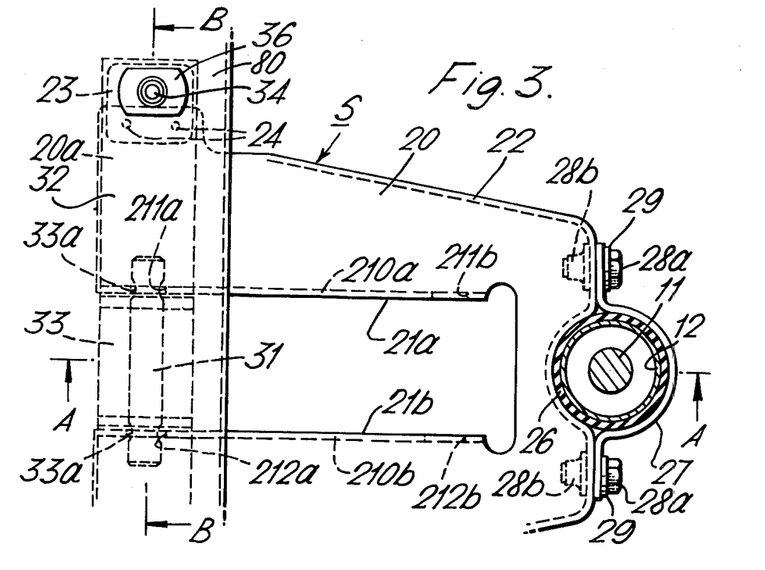
FIG. 3 shows a partial sectional-plane view of a first embodiment in accordance with the present invention.

FIGS. 3 to 6, inclusive, are for a first preferred embodiment of the present invention. The energy absorbing device S comprises a column stay 20 for holding the column tube 12 substantially at a right angle against the instrument panel 80 and a guide pin 31 for guiding the column stay 20 in its foward movement by a predetermined or more force loading in a forward direction on the upper portion of the steering column 10. As best shown in FIG. 3, the column stay 20 is formed in a substantial V-shape and provided with a pair of inner reinforcement flanges 21a and 21b jutting downwardly in parallel from the inner edge thereof and an outer reinforcement flange 22 extending downwardly from the outer edge thereof. The inner flanges 21a and 21b have respectively longitudinally tapered slits 210a and 210b positioned correspondingly with each other and substantially at a right angle toward the steering column 10. The slits 210a and 210b are provided at both ends thereof respectively with holes 211a, 211b and with 212a and 212b.

Figure 6:
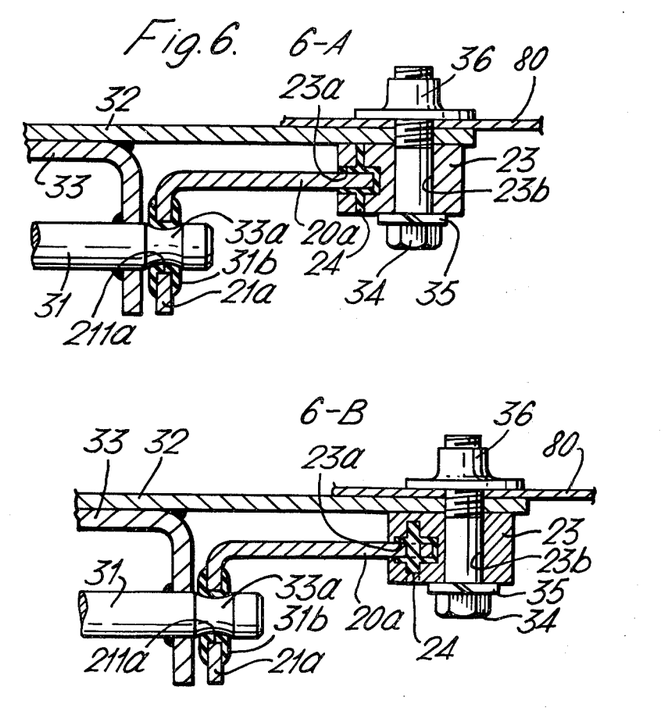

It may not be indispensable that the slits 210a and 210b are formed in the longitudinally tapered shape. They may be straight or an arc, or, furthermore, as well shown in FIG. 6-A, are covered with synthetic resin 31b. A pair of capsules 23, one of them only being shown in FIGS. 3 and 4, has recesses 23a, 23a thereon engaged loosely in the side edges 20a, 20b of the column stay 20. Synthetic resin 24, for instance epoxyresin, is filled in spaces between the column stay 20 and the capsule 23 to form a shearable connection so that the column stay 20 may slidably move with the predetermined or more impact load exerted thereon. A bolt 34 is inserted into a through hole 23b of the capsule 23 through a spring washer 35 and threaded into a nut 36 welded on the upper face of the lower portion of the instrument panel 80. Thus, the column stay 20 is releasably fastened onto the instrument panel 80 together with a bracket 32.

Figure 4:
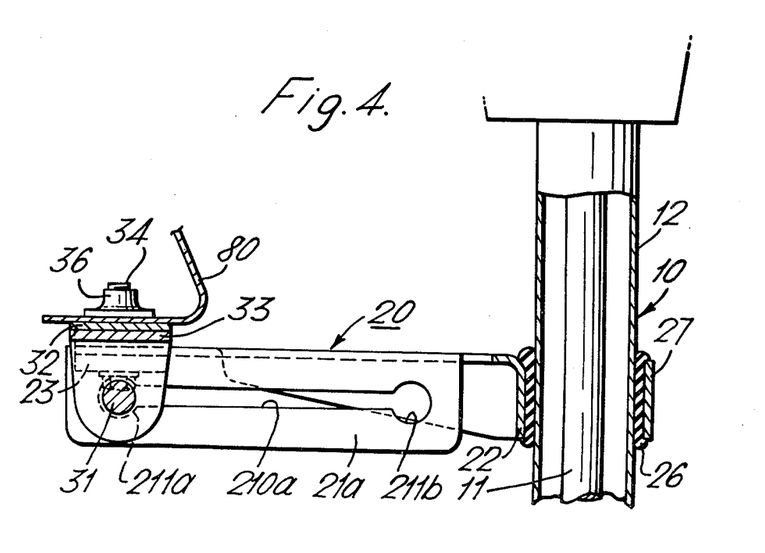
FIG. 4 is an elevational sectional view taken along A—A line in FIG. 3.
Figure 5:
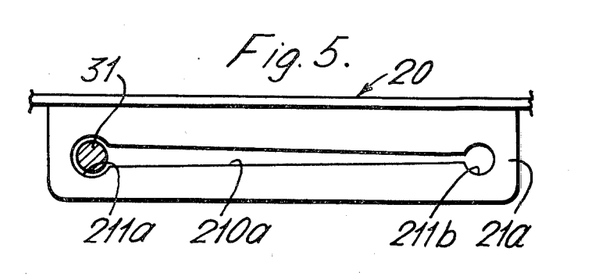
FIG. 5 is a partially enlarged view of the column stay shown in FIG. 4.

As shown in FIGS. 3 and 4, the right end portion of the column stay 20 and a clamping member 27 incorporate to hold the column tube 12 therebetween through a cylindrical spacer 26 made of such elastic materials as rubber, synthetic resin and the like. The clamping member 27 is fastened onto the outer flange 22 of the column stay 20 by way of a bolt 28a threaded through a spring washer 29 into a nut 28b welded on the inner face of the outer flange 22. It should be clear here that the column tube 12 is firmly supported in its normal position.

The guide pin 31 is welded on a strut 33 welded on the central portion of the bottom side of the bracket 32 fastened on the instrument panel 80 together with the capsule 23. The strut 33 has a substantial U-shape section and is interposed between the pair of inner flanges 21a and 21b. Grooves 33a provided on the both ends of the guide pin 31 are loosely engaged in the holes 211a and 212a of the inner flanges 21a and 21b. The said grooves 33a of the guide pin 31 are to secure the moving direction of the column stay 20 when the column stay 20 moves forward by operation described hereinafter. The grooves 33a may be replaced with guide rings and the like.

With the above-mentioned steering column 10 constructed in accordance with the present invention, an impact load exerted to the steering wheel 16 through a driver in occurrence of a collision of the vehicle is transmitted to the column stay 20 holding the steering column 10. The transmitted load breaks the shearable connection between the capsule 23 and the column stay 20 to cause a forward movement of the column stay 20 at the bottom side of the instrument panel 80. As the column stay 20 moves forwardly, the slits 210a and 210b of the inner flanges 21a and 21b are gradually and slidably pushed forward to be expanded, the movement of the slits 210a and 210b being guided by the grooves 33a of the guide pin 31 fastened onto the stay 33. Consequently, the load from the driver exerted to the steering wheel 16 is absorbed by the frictional expanding process of the slits 210a and 210b against the guide pin 31.

As well described hereinabove, in the first preferred embodiment, collision energy is substantially absorbed by expanding operation of the slits 210a and 210b. The energy absorbing cooperation can, therefore, be well controlled by proper selections of a width, a length and a shape for the slits 210a and 210b, by changing properly the thickness of the inner flanges 21a and 21b, and/or by adaption of rubber, synthetic resin and the like to cover the upper and lower ends of the slits 210a and 210b and/or the guide pin 31. In absorbing the impact energy, the guiding operation of the guide pin 31 can deflect the steering column stay 20 within a given range limited in a forward direction so as to prevent any side-movements of the steering column 10.

In the above description, the column stay 20 is fastened to the instrument panel 80 by way of synthetic resin 24 which will disconnect the column stay 20 from the instrument panel 80 with exersion of a predetermined or more forward impact load onto the column stay 20. In this instance, more specifically, the column stay 20 is fastened on the capsule 23 fixedly secured on the instrument panel 80 through the synthetic resin 24. The synthetic resin 24 may be replaced with a shearable pin 24 made of synthetic resin or metal as well shown in FIG. 6-B.

Figure 7:
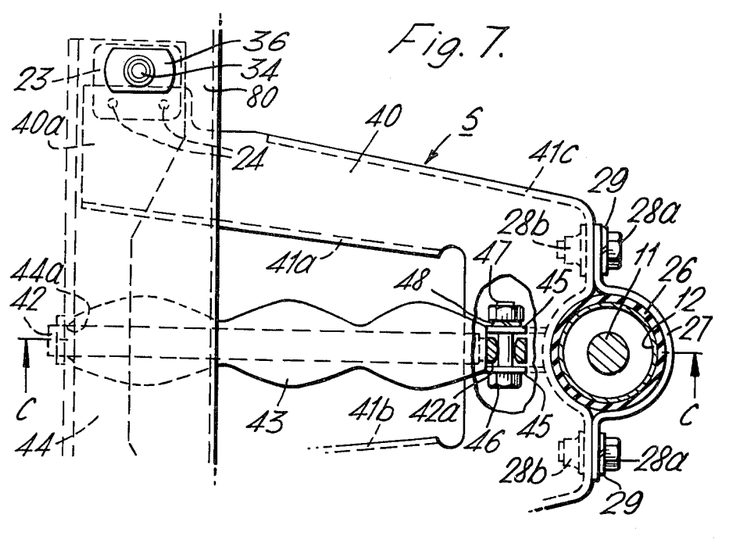
FIG. 7 illustrates a partial sectional-plane view of a second embodiment in accordance with the present invention.
Figure 8:
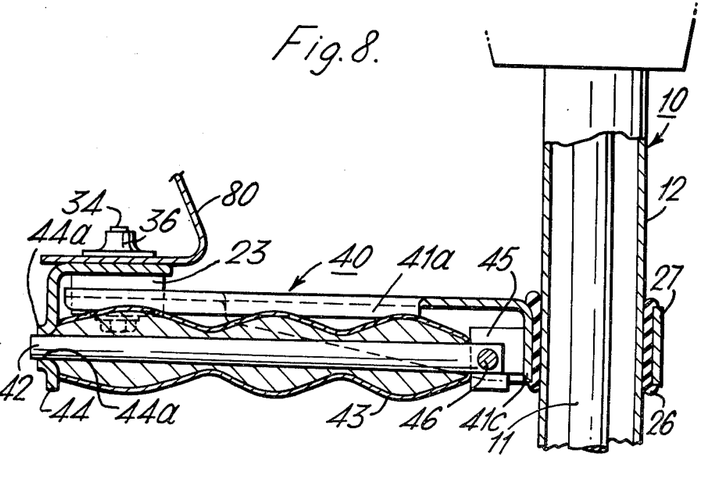
FIG. 8 is an elevational sectional view taken along C—C line in FIG. 7.

A second preferred embodiment of the present invention is illustrated in FIGS. 7 and 8, wherein the energy absorbing device S comprises a column stay 40 for supporting the column tube 12 substantially at a right angle against the instrument panel 80, a guide rod 42 connected to the column stay 40 and an energy absorbing member 43 surrounding the guide rod 42. The energy absorbing member 43 functions to absorb forward impact force loading to the column tube 12 in a predetermined or more value by way of axial and vertical deformation thereof when the column stay 40 moves forward by the load, and the guide rod 42 guides the column stay 40 in accordance with the forward movement of the column stay 40.

The column stay 40 is formed in a substantial V-shape and provided at the inside thereof with inner reinforcement flanges 41a and 41b projecting downwardly and at the outer edge thereof with an outer reinforcement flange 41c jutting downwardly. The column stay 40 is mounted at one end thereof on the instrument panel 80 by the same shearable connection as in the first preferred embodiment and the column tube 12 is supported at the other end of the column stay 40 substantially at a right angle by the same construction as in the first preferred embodiment.

A pair of supporting metal pieces 45 is welded on the inside of the outer flange 41c of the column stay 40 to have a bolt 46 thereon threaded into a nut 47 through a spring washer 48. The guide rod 42 is rotatably jointed with the bolt 46, and the top end of the guide rod 42 is slidably supported in a supporting hole 44a drilled through a bracket 44 with a L-shaped cross-section, the bracket 44 being fixed on the instrument panel 80 together with the capsule 23. The guide rod 42 has a through connecting hole 42a which has a spheric wall so that the guide rod 42 can be in connection with the bolt 46 rotatably in vertical and horizontal directions.

The energy absorbing member 43 is made of steel meshes or stamped steel strips formed or assembled in a zigzag configuration with spaced apart creases or bends. The guide rod 42 is positioned axially in the center of the energy absorbing member 43 the both ends of which are engaged respectively with the inner face of the bracket 44 and the supporting metal pieces 45. The longitudinal section of the energy absorbing member 43 takes a waving shape so as to deform itself axially and vertically in response to a forward impact load given thereon in a value exceeding a predetermined one.

In occurrence of the collision of the vehicle, an impact load from the driver is exerted onto the steering wheel 16 and the load is transmitted to the column stay 40 holding the steering column 10 in its normal position. As in the case of the first preferred embodiment, the column stay 40 is freed from the instrument panel 80 and moves forwardly. As the column stay 40 goes forwardly, the load is exerted on the energy absorbing member 43. Sequently, the energy absorbing member 43 is allowed to buckle and the guide rod 42 proceeds forward to jut out through the bracket 44. Thus, the impact load given to the steering wheel 16 is absorbed to protect the driver.

Since the collision energy absorbing operation is carried out in the way as detailed hereinabove, it can well be controlled and adjusted by proper selections of a shape, a construction and/or materials for the energy absorbing member 43. The energy absorbing operation can deflect the steering column 10 within a certain given range limitted in a forward direction so as to prevent any side movements of the steering column 10.

Figure 9:
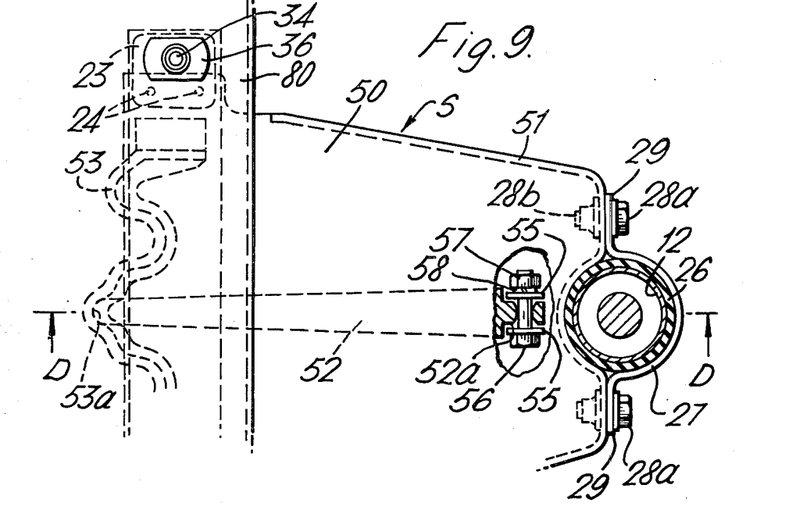
FIG. 9 shows a partial sectional-plane view of a third embodiment in accordance with the present invention.
Figure 10:
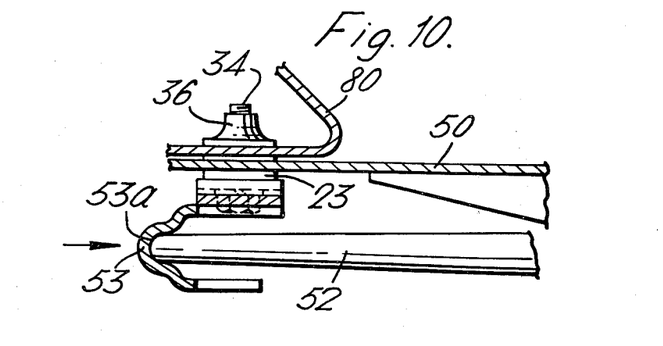
FIG. 10 is an elevational sectional view taken along D—D line in FIG. 9. drivers.
Figure 11:
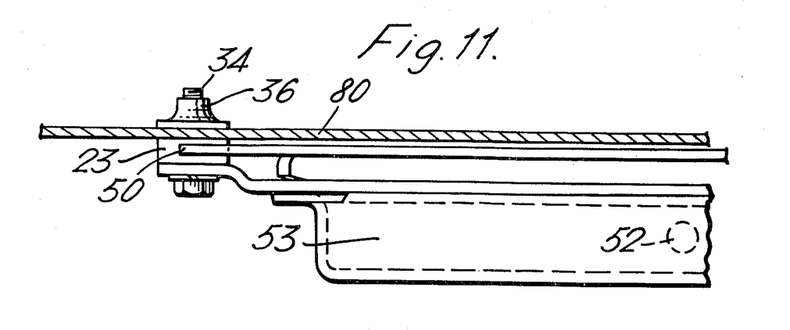
FIG. 11 is a side view taken along an arrow in FIG. 10.

A third preferred embodiment is referred to FIGS. 9 and 10. The energy absorbing device S comprises a column stay 50 for supporting the column tube 12 substantially at a right angle against the instrument panel 80, an energy absorbing member 53 to be deformed for the energy absorbing operation thereof when the column stay 50 makes a forward movement in response to a forward impact load given to the column tube 12 in a value exceeding the predetermined one and a push rod 52 for deforming the energy absorbing member 53 in the forward movement of the column stay 50. As best shown in FIG. 9, the column stay 50 is formed in a substantial trapezium and provided at its outer edge with a reinforcement flange 51 projecting downwardly. This column stay 50 is mounted at one end thereof on the instrument panel 80 in the same shearable connection as in the first preferred embodiment, and at the other end of the column stay 50, the column tube 12 is supported substantially at a right angle in the same way as in the first preferred embodiment. The energy absorbing member 53 is a steel pressed piece with a substantially U-shaped cross-section and formed to have properly forward and rearward curving portions. This energy absorbing member 53 is welded on the bottom side of the instrument panel 80 and has an indent 53a at the center thereof to receive the top end of the push rod 52 of which the base portion is rotatably connected with the column stay 50. The push rod 52 is mounted on the column stay 50 in the same way as in the second preferred embodiment and no repetition is made here.

With the above-mentioned third preferred embodiment of the present invention, in the case of an unfortunate occurrence of a vehicle collision, a forward impact load is exerted to the steering wheel 16 through the driver. The load is then transmitted to the column stay 50 holding the steering column 10 approximately at a right angle. Through the same operation as in the first preferred embodiment, the column stay 50 is freed from the instrument panel 80 and moves forward. In accordance with the forward movement of the column stay 50 the push rod 52 integrally interlocked with the column stay 50 urges the energy absorbing member 53 to deform it for energy absorbing operation.

It should now be very clear that the impact energy absorbing operation can well and easily be controlled and adjusted by proper selections of a thickness, a number of the curved portions and a shape of the cross-section of the energy absorbing member 53. In the energy absorbing operation, the operation of the push rod 52 can deflect the steering column 10 in a certain given range limited in a forward direction so as to prevent any side movements of the steering column 10.

Figures 12, 13:
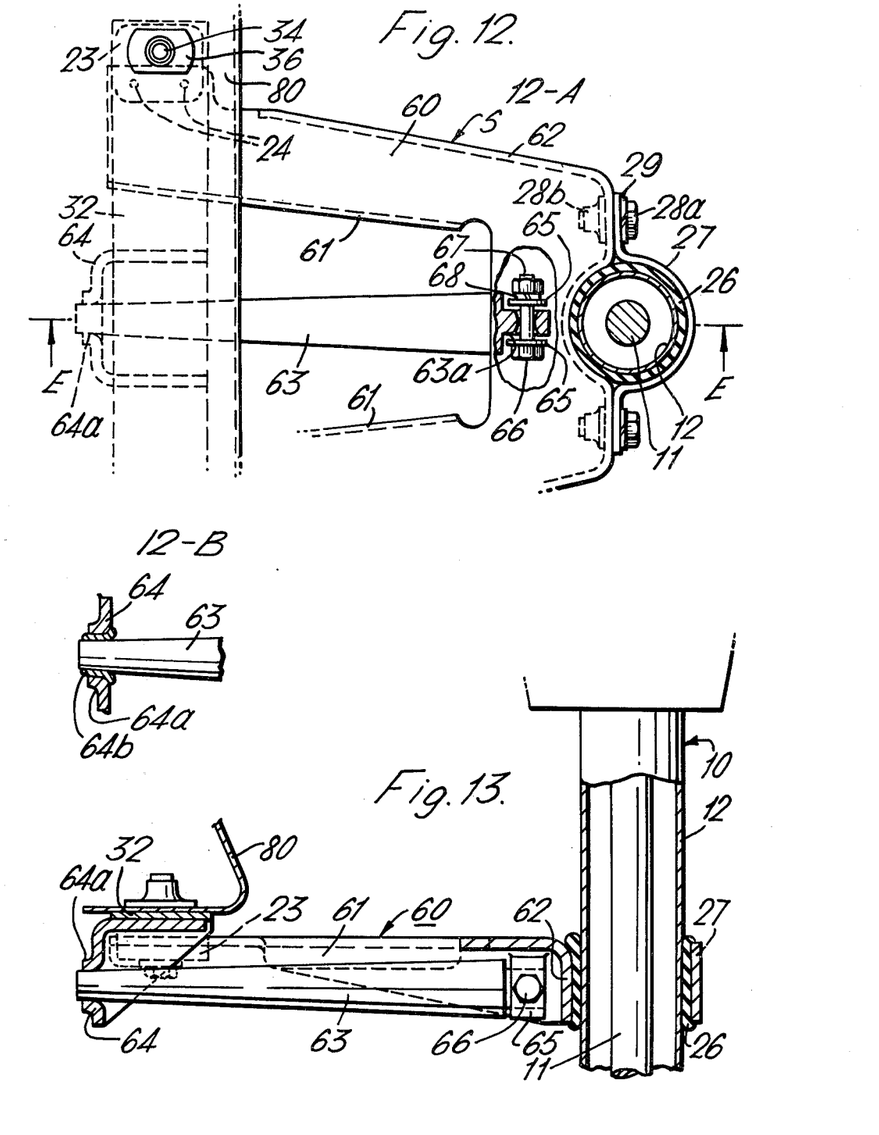
FIG. 12 includes FIGS. 12-A and FIG. 12-B and shows a partial sectional-plane view of a fourth embodiment in accordance with the present invention FIG. 12-B shows a modification of FIG. 12-A.
FIG. 13 shows an elevational sectional view taken along E—E line in FIG. 12.

Now reference is made to FIGS. 12 and 13 for a fourth preferred embodiment of the present invention. The energy absorbing device S comprises a column stay 60 for supporting the column tube 12 substantially at a right angle against the instrument panel 80, an energy absorbing member 64 to buckle for its impact energy absorbing operation when the column stay 60 moves forward by a forward impact load given to the column tube 12 in a value exceeding a predetermined one and a push rod 63 to buckle the energy absorbing member 64 in response to the forward movement of the column stay 60. The column stay 60 is, as best shown in FIG. 12, formed approximately in a V-shape and provided at its inner edge with inner reinforcement flanges 61, 61 and at its outer edge with an outer reinforcement flange 62, the flanges 61, 61 and 62 being projected downwardly. This column stay 60 is firmly mounted at its one end on the instrument panel 80 in the same shearable connection as in the case of the first preferred embodiment. At the other end of the column stay 60, the column tube 12 is supported substantially at a right angle in the same way as in the first preferred embodiment.

The energy absorbing member 64 is welded on the bracket 32 fixed on the instrument panel 80 together with the capsule 23 as explained in detail in the first preferred embodiment. The energy absorbing member 54 has a substantial L-shape (or U-shape) in section and is provided at a portion thereof with a barring portion 64a to have the top end of the push rod 63 inserted therein. The barring portion 64a may be prepared in a plural number along the axis of the push rod 63 and/or covered with synthetic resin 64b as shown in FIG. 12-B. The push rod 63 is tapered in section to be with larger diameters toward its base end and loosely and slidably engaged with the barring portion 64a of the energy absorbing member 64. In this embodiment, too, the same mounting construction of the push rod 63 to the column stay 60 is applied as in the second preferred embodiment.

A forward impact load produced by a vehicle collision is exerted to the column stay 60 by way of the driver, the steering wheel 16 and the steering column 10. Through the same process as in the first preferred embodiment, the shearable connection of the column stay 60 with the instrument panel 80 is broken and the column stay 60 moves forward. Sequently, the push rod 63 integrally interlocked with the column stay 60 is pushed forward to expand, in turn, the barring portion 64a of the energy absoring member 64 by way of its tapered periphery. Thus, the forward impact energy is absorbed to protect the driver.

The impact energy absorbing operation can well be controlled and adjusted by proper selections of a number, a size and materials of the barring portion 64a and also by changes of the tapering degree of the push rod 63. In the energy absorbing operation, the steering column 10 can be tilted in a certain given range by operation of the push rod 63.

Figure 14:
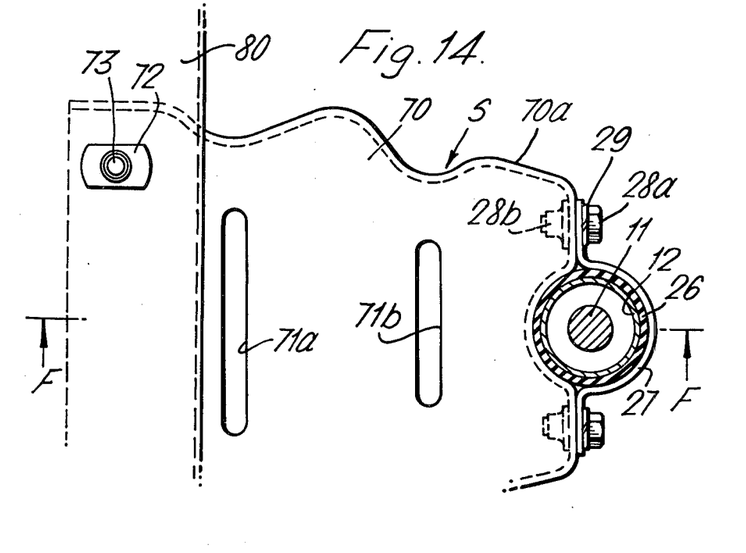
FIG. 14 shows a partial sectional-plane view of a fifth embodiment in accordance with the present invention.
Figure 15:
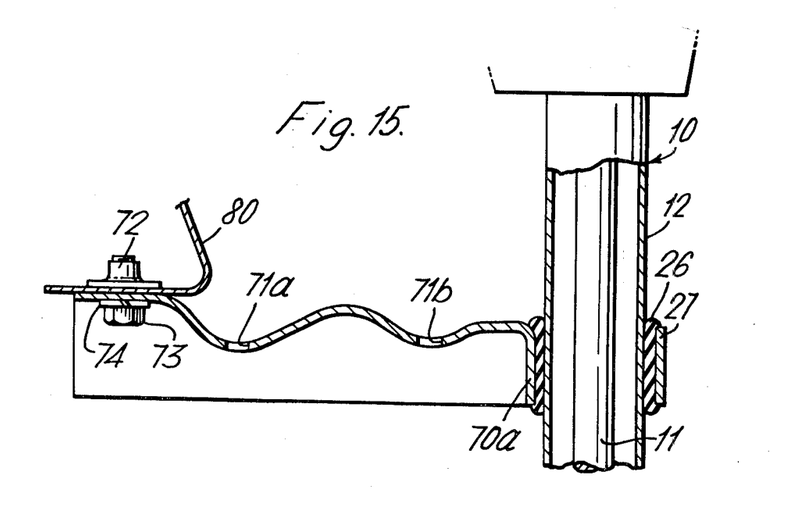
FIG. 15 is an elevational sectional view taken along F—F line in FIG. 14.

A fifth preferred embodiment of the present invention is preferred to FIGS. 14 and 15. The energy absorbing device S comprises a column stay 70 for supporting the column tube 12 substantially at a right angle. Proper wave shapes are applied for the sides and cross-section of the column stay 70 which is a pressed work out of steel sheet. Slits 71a and 71b are transversely provided in the indented portions of the waved surface of the column stay 70. A flange 70a juts down from the outer edge of the column stay 70 one end of which is firmly secured on the instrument panel 80 at two or more portions by fastening bolts 73 threaded through spring washers 74 into nuts 72 welded on the lower inner face of the instrument panel 80. At the other end of the column stay 70, the column tube 12 is supported substantially at a right angle as in the case of the first preferred embodiment.

A forward impact load from the driver in occurrence of the vehicle collision is transmitted to the column stay 70 through the driver, the steering wheel 16, the steering column 10 and the column stay 70. The transmitted load compresses the column stay 70 and, thus, the wave portions of the column stay 70 buckles to absorb the energy not to give to the driver sudden reaction force.

The energy absorbing operation is well controlled and adjusted by proper selections of a thickness, a wave shape and pitch, and materials of the column stay 70 and of shapes and sizes for the slits 71a and 71b. In the energy absorbing operation, the steering column 10 can deflected in a certain given range.

Figure 16:
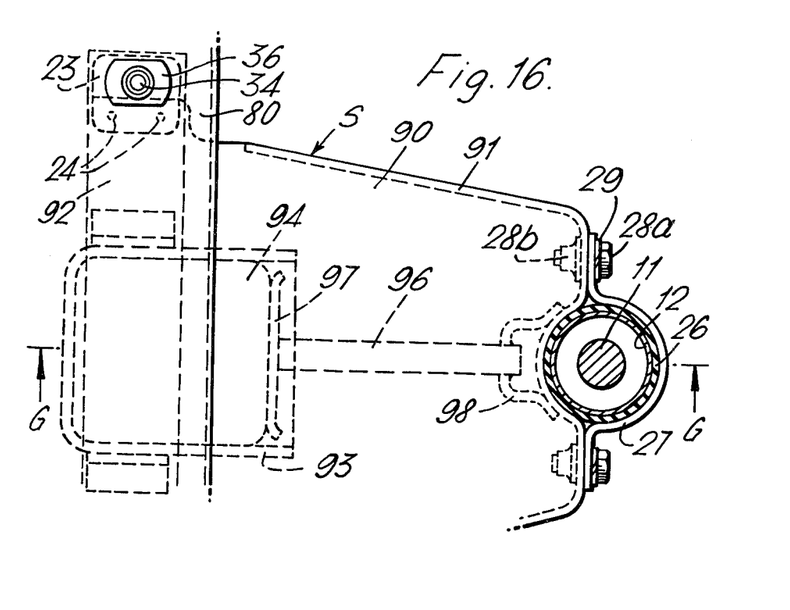
FIG. 16 is a partial sectional-plane view of a sixth embodiment in accordance with the present invention.
Figure 17:
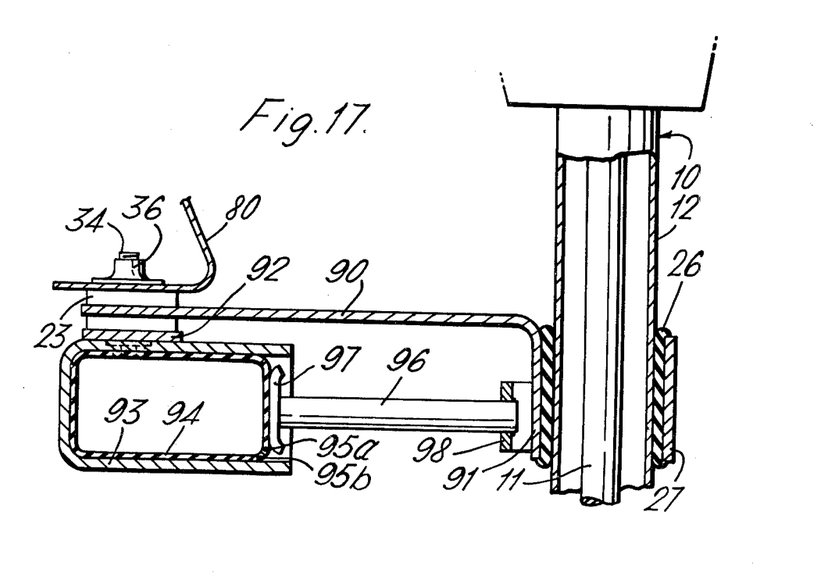
FIG. 17 is an elevational sectional view taken along G—G line in FIG. 16.
Figure 18:
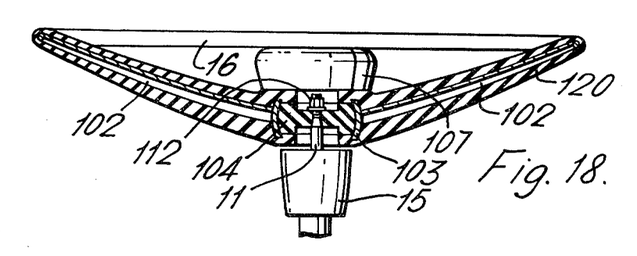
FIG. 18 shows an elevational section of a steering wheel device characterized with another feature of the present invention.

FIGS. 16 and 17 illustrate a sixth preferred embodiment of the present invention. The energy absorbing device S comprises a column stay 90 to support the column tube 12 substantially at a right angle against the instrument panel 80, a piston 96 integrally secured on the column stay 90 and an energy absorbing bag 94 for absorbing a forward impact energy as it is compressed by the piston 96 in the forward movement of column stay 90 when the column tube 12 is given a forward impact load exceeding a predetermined value. The column stay 90 is formed to have a configuration of an approximate trapezium as well seen in FIG. 16. A reinforcement flange 91 is provided to project downwardly from the outer edge of the column stay 90 one end of which is firmly secured on the instrument panel 80 as done in the first preferred embodiment. The column tube 12 is supported as done in the first preferred embodiment at the other end of the column stay 90. The energy absorbing bag 94 is made of such flexible materials as rubber, synthetic resin and the like and has at least one hole 95a at an adequate portion thereof. The energy absorbing bag 94 is filled with hydraulic or pneumatic fluid and the hole 95a is sealed with a sealing member 95 b. A supporting case 93 is welded at the center portion of the bottom face of the bracket 92 secured on the instrument panel 80, the supporting case 93 being open at one side to receive the energy absorbing bag 94 therein. The piston 96 has its base portion welded on a bracket 98 which is welded on the inner surface of the flange 91 of the column stay 90, the piston 96 being positioned to project substantially at a right angle toward the column tube 12. A plate piece 97 is provided at the top end of the piston 96 and in touch with a side face of the energy absorbing bag 94.

In occurrence of a vehicle collision, the column stay 90 receives a forward impact load transmitted thereto through the driver, the steering wheel 16 and steering column 10. The same process detailed in the first preferred embodiment disconnects the column stay 90 from the instrument panel 80 and the column stay 90 moves forward. This forward movement of the column stay 90 pushes forwardly the piston 96 integrally interlocked with the column stay 90. The plate piece 97 of the piston 96 compresses the energy absorbing bag 94 to increase the hydraulic or pneumatic pressure inside the energy absorbing bag 94. When the pressure reaches a certain given value, the sealing member 95b is blown off from the hole 95a through which, in turn, the fluid escapes to absorb the impact force.

The energy absorbing operation can easily be controlled and adjusted by proper selections of a size and materials of the bag 94 and/or a size and a number of the hole 95a. In the energy absorbing operation, the steering column 10 can be deflected in a certain predetermined range.

The safety features of the present invention are furthermore characterized with the following construction of a steering wheel device. Reference is now made to FIGS. 18 to 23, inclusive, wherein disclosed is the steering wheel 16 which includes two spokes 102, 102 having a U-shaped cross section. The spokes 102, 102 extend integrally along the radius of the steering wheel 16 and the base ends of the spokes 102, 102 are welded on the periphery of a supporting member 103. The supporting member 103 is a ring member with an arc cross section and as well shown in FIGS. 21 and 22, a concaved spheric wall 131 is formed on the inner circumference of the supporting member 103. A recess 132 is cut off from the upper portion of the supporting member 103. A hub 104 has a taper hole 141 and a serration 142 drilled at the center portion thereof and a tapered portion 161 and a serration 162 at the top end of the steering shaft 11 are engaged with the taper hole 141 and the serration 142. A threaded portion 163 bossed from the steering shaft 11 into a cavity 110 of the hub 104 is fastened by a lock nut 112 through a spring washer 111 so that the hub 104 is firmly secured on the top end of the steering shaft 11 and never allowed to rotate. The periphery of the hub 104 is designed to have a convexed spheric wall 143 which corresponds with the concaved spheric wall 131 of the supporting member 103. The supporting member 103 is coupled with the hub 104 to be rotatable by way of the corresponding spheric walls 131 and 143. A plurality of through holes 133 are radially drilled on the supporting member 103 (in this embodiment four through holes) and correspondingly a plurality of holes 144 are also provided on the spheric periphery 143 of the hub 104. The supporting member 103 and the hub 104 are integrally secured by shearable pins 105 inserted into the holes 133 and 144. The shearable pins 105 are made of synthetic resin or metal. The supporting member 103 and the hub 104 are molded correspondingly with the synthetic resin 120 covering the steering wheel 16 and the spokes 102, 102. And the supporting member 103 is further prohibited to rotate against the hub 104 by way of the synthetic resin 120 molded around the shoulders 103a thereof. The recess 132 of the supporting member 103 is for easy coupling of the hub 104 into the supporting member 103 and, upon completion of the assembling work of the hub 104 to the supporting member 103, is mounted with a filling member 109 and covered up with the synthetic resin 120 integrally molded. Indicated with a reference numeral 107 is a horn button positioned at the center of the steering wheel 16.

Figure 19:
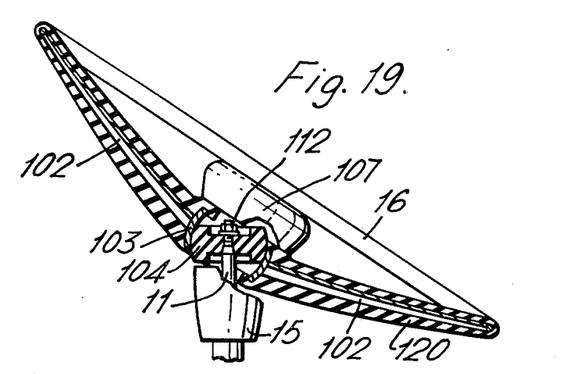
FIG. 19 shows the steering wheel device shown in FIG. 18 when deflectively displaced.
Figure 20:
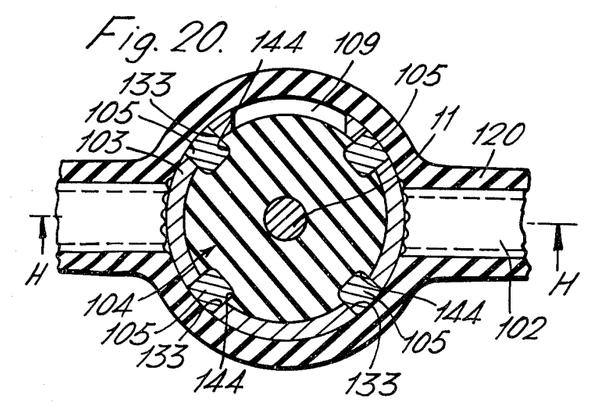
FIG. 20 shows a partially enlarged sectional-plane view of the steering wheel device in FIG. 18.

In occurrence of a vehicle collision, a forward impact load from the driver is exerted to the steering wheel 16 at a limited portion. When this impact load exceeds a predetermined value, the shearable pins 105 are sheared off to disconnect the supporting member 103 from the hub 104. The synthetic resin 120 around the supporting member 103 is broken and the supporting member 103 makes frictional rotation along the spheric periphery 143 of the hub 104 in response to the direction of the load force. This deflects the steering wheel 16 as shown in FIG. 19. The supporting member 103 never comes off from the hub 104 in the shock absorbing rotation. It is now clear that in the vehicle collision, the load collectively given to a limited portion of the steering wheel 16 is turned to be received by the whole steering wheel 16 to soften the impact force given to the driver.

The impact load absorbing operation can well be controlled by the proper selections of a nature and a shape of the shearable pins 105 and connecting force between the supporting member 103 with the synthetic resin 120.

Another embodiment is disclosed in FIG. 24–30, inclusive, wherein there is shown a spoke 201 radially extending from a steering wheel (not shown). The base end of the spoke 201 is welded on the annular periphery of an upper hub member 202. An annular lower hub member 204 secured on the steering shaft 11 is connected with the upper hub member 202 by way of a cylindrical energy absorbing member 203 the top end of which is welded on the neck of the upper hub member 202. The spoke 201, the upper hub member 202, the energy absorbing member 203 and the lower hub member 204 are molded all over with synthetic resin 205 to form the whole steering wheel.

Figure 25:
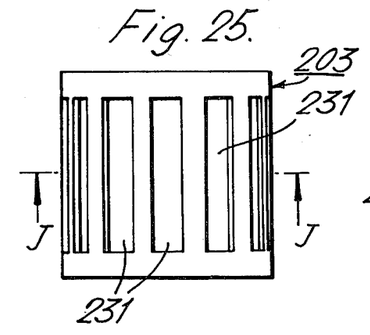
FIG. 25 is a front view of an energy absorbing member which is an important construction member of the device shown in FIG. 24.
Figure 26:
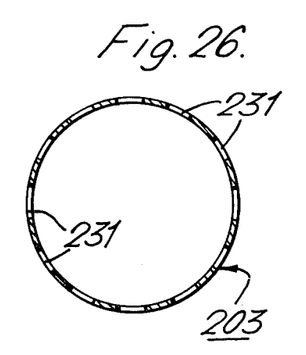
FIG. 26 is a cross-sectional view taken along J—J line in FIG. 25.
Figure 27:
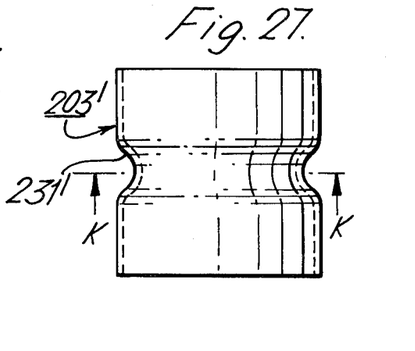
FIG. 27 shows a front view of a modification of the energy absorbing member in FIG. 25.
Figure 28:
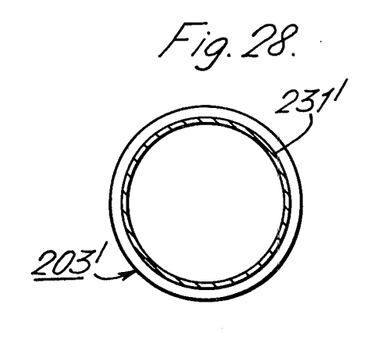
FIG. 28 shows a cross-sectional view taken along K—K line in FIG. 27.
Figure 29:
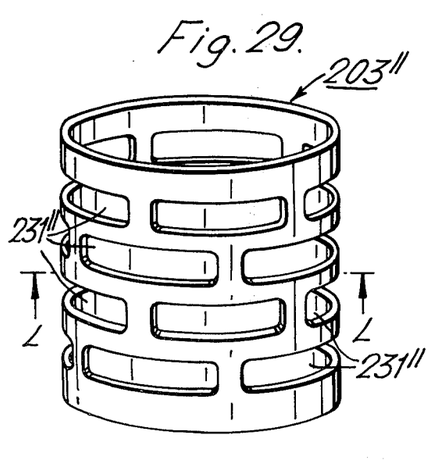
FIG. 29 shows a front view of another modification of the energy absorbing member in FIG. 25.
Figure 30:
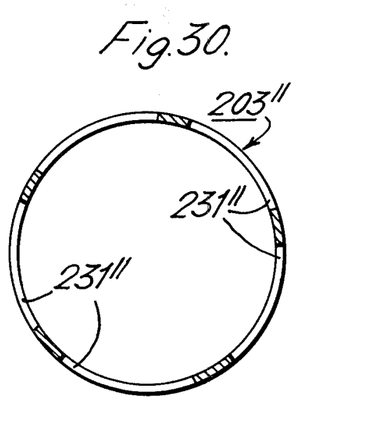
FIG. 30 is a cross-sectional view taken along L—L line in FIG. 29.

The energy absorbing member 203 is formed in a cylindrical shape out of sheet metal with a selected thickness, as well illustrated in FIG. 25. A plurality of oblong cut-out holes 231 are provided axially on the periphery of the energy absorbing member 203. The strength of the energy absorbing member 203 can well be adjusted by proper selections of a size, shape, and number of the holes 231 and/or a thickness of sheet metal. When molded integrally with the synthetic resin 205, the energy absorbing member 203 has its holes 231 filled with the synthetic resin 205. Serration 241 and a taper hole 242 are provided respectively at the upper center portion and at the lower center portion of the lower hub member 204. Serration 261 and a tapered portion 262 provided at the top end of the steering shaft 11 are engaged with the serration 241 and the taper hole 242 which are firmly secured on the steering shaft 11 by a nut 211 threaded through a spring washer 212 onto a threaded portion 263 jutting up into a cavity formed within the energy absorbing member 203. A horn button 208 is made of elastic synthetic resin, for instance, uretan rubber, integrally with a base plate 281 and assembled by a screw 283 through a coil spring 210 and a ring 213 on a holding member 209 of a cup shape secured on a shoulder of the inner circumference of the upper hub member 202.

Figures 21, 22, 23, 24:
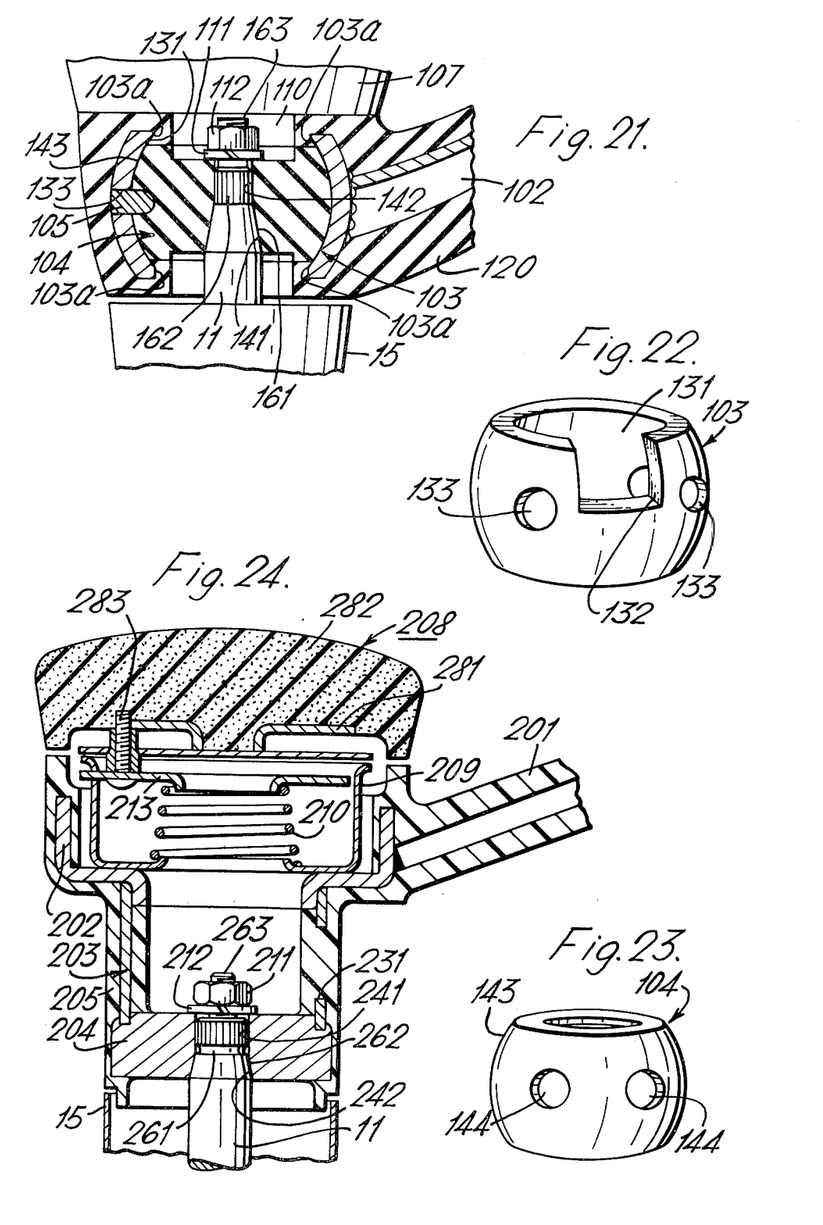
FIG. 21 is an enlarged elevational sectional view taken along H—H line in FIG. 20.
FIG. 22 is a perspective view of a supporting member to support spokes shown in FIGS. 18-21, inclusive.
FIG. 23 is a perspective view of a hub fixed on the steering shaft shown in FIGS. 18-21, inclusive.
FIG. 24 shows an elevational sectional view of a modification of the steering wheel device shown FIG. 18.

In occurrence of a vehicle collision, a forward impact load from the driver is exerted on the steering wheel 16 at a limited portion. The transmitted load compresses and deforms the energy absorbing member 203 and sequently, the synthetic resin 205 is broken. Thus, the steering wheel 16 is turned in response with the load operating direction. Therefore, although a portion of the driver's body is impactly struck to a limited portion of the wheel, the impact load is received by the whole wheel 16 so as to protect the driver.

In the above embodiments, the strength of the energy absorbing member 203 is to be adjusted by a shape, size and number of the holes 231. The adjustment can be made as well by changes of the shape of an indent 231' provided on a cylindrical energy absorbing member 203', shown in FIG. 27, to replace the energy absorbing member 203. The energy absorbing member 203 can also be replaced with another 203'', shown in FIGS. 29 and 30, which has a plurality of oblong holes 231'' cut off therefrom, the oblong holes 231'' being horizontally positioned zig-zag to each other. The strength adjustment of the energy absorbing member 203'' can be made by good selections of a shape, size and number of the holes 231'' and/or a thickness of the energy absorbing member 203'' itself. With the steering wheel 16 adopting the energy absorbing member 203'', the forward impact load exerted thereto from any direction can well be absorbed and softened by buckling deformation of the energy absorbing member 203".

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a vehicle having a steering column assembly, including a steering shaft, steering gear means, means for flexibly coupling said shaft vertically to said gear means for forward pivotal movement of said shaft, and a column tube having said steering shaft journalled therein and permitting said forward pivotal movement of said shaft, apparatus for supporting said steering column assembly, comprising: a support structure releasably coupled at its front part to the body structure of said vehicle and fixedly coupled at its rear part to said steering column tube, said steering assembly support structure including an impact energy absorbing member transversely mounted on said body structure to be plastically expanded forwardly and means coupled with said steering column for forwardly expanding said energy absorbing member by impact energy exerted thereon from said steering column.

2. A steering column supporting apparatus as claimed in claim 1, wherein said steering assembly support structure comprises a column stay, means securing the rear end portion of said column stay on said steering column, means releasably mounting the front end portion of said column stay on a portion of the instrument panel of the vehicle, an expandable member securely mounted at its both ends on said instrument panel transverse to the front portion of said column stay, and a guide rod positioned longitudinally along said column stay with its rear end coupled to said steering column and its front end engaged with a portion of said expandable member, whereby said guide rod forwardly expands said expandable member to absorb the forward impact energy and guides the expanding direction of said expandable member when an impact force is exerted onto the upper portion of said steering column.

3. A steering column supporting apparatus as claimed in claim 2, wherein said expandable member is formed with a transversely wave-shaped member having a substantially U-shaped cross-section.

4. A steering column supporting apparatus as claimed in claim 3, wherein said expandable member is formed of a pressed sheet metal.

5. A steering column supporting apparatus as claimed in claim 2, wherein said means for releasably mounting the front end portion of said stay on the portion of the instrument panel comprises a pair of capsules secured under the instrument panel to receive respectively the both sides of the front portion of said stay and a pair of securing elements to adhere on the interiors of said capsules for receiving said stay.

6. A steering column supporting apparatus as claimed in claim 2, wherein said means for releasably mounting the front end of said stay on the portion of the instrument panel comprises a pair of capsules secured under the instrument panel of the vehicle to receive respectively the both sides of the front portion of said column stay and a pair of shearable pins holding said both sides of said column stay within said capsules.

* * * * *